United States Patent Office 3,341,296
Patented Sept. 12, 1967

3,341,296
ORTHORHOMBIC BORON ARSENIDES AND THEIR PREPARATION
Forrest V. Williams, Dayton, Ohio, assignor to Monsanto Company, a corporation of Delaware
No Drawing. Original application July 21, 1958, Ser. No. 749,661. Divided and this application Aug. 2, 1965, Ser. No. 505,774
3 Claims. (Cl. 23—204)

This application is a division of applicant's copending application Ser. No. 749,661, filed July 21, 1958.

The present invention relates to new compositions of matter containing boron and arsenic, and a process for preparing the same.

It is an object of this invention to provide new compounds respectively having the formula, BAs and another composition of controlled variable composition, approximately $B_6As$ in the form of well-crystallized, thermally-stable and chemically-inert materials. It is a further object to provide new, chemically resistant forms of boron arsenide which may be prepared in the form of granular, crystalline particles suitable for use in various industrial applications. It is a still further object of this invention to provide a process by which semi-conductor materials may be made. It is also an object to make structures such as chemical apparatus or turbine blades which may be prepared from boron arsenide. Further objects and advantages of my invention will be apparent from the following description.

My news forms of boron arsenide are readily prepared by exposing boron in elementary form to arsenic vapor at an elevated temperature. For this purpose boron in the form of amorphous or crystalline particles is employed. Amorphous boron is available commercially in the finely-divided state and may be directly employed in this readily-available form. Crystalline boron is also available commercially in various degrees of sub-division and may also be employed in this form. The reaction here involved is somewhat slower for the crystalline form of boron; however, the reaction may be caused to proceed to any degree of completeness merely by continuing the treatment with arsenic vapor for a sufficiently long period of time, or by increasing the temperature at which the reaction is carried out, or by other means hereinafter disclosed.

The temperature of reaction between the boron and arsenic will generally be above about 700° C. and may be as high as 1200° C. or even higher. The time required for the reaction is dependent upon the temperature and degree of sub-division of the boron and the ease with which the arsenic vapor penetrates the mass of boron powder.

When exposing the boron to the action of arsenic vapor the boron powder may be spread out in a relatively thin layer, so that the arsenic vapor quickly penetrates the entire mass. However, a compact mass of powder may also be treated with arsenic vapor, under which conditions the diffusion of the vapor into the mass of powder will, of course, be somewhat slower. When working with loose, uncompacted masses of boron particles I have found that the zone of penetration and reaction of the arsenic vapor with the loose boron will be more or less sharply defined and that it is possible after cooling the mass to physically separate the boron arsenide sintered mass from the loose and unreacted boron. The unreacted or partly reacted boron particles may, of course, be returned to the reaction for further treatment.

The boron arsenides which are obtained in accordance with the method of the present invention occur in two distinct forms. It has been found that the reaction of elemental boron with elemental arsenic at temperatures below about 1200° C. gives an orthorhombic crystalline form of material having the approximate composition of $B_6As$. However, it has been found that some variation of this stoichiometric formula is possible and that the orthorhombic structure is retained with boron arsenides having compositions with formulas in the range of from $B_5As$ to $B_7As$ including fractional proportions such as $B_{5.5}As$. This orthorhombic crystalline product is characterized by extreme resistance against dissolution by acids and bases. For example, it has been found that fuming nitric acid, as well as aqua regia, are without effect upon the said product.

Another embodiment of the invention is a crystalline form of a boron arsenide having the formula BAs, and characterized by a cubic crystalline structure. This product is obtained when the reaction between elemental boron and elemental arsenic is carried out at a lower temperature, for example, temperatures in the range of from 700° C. to 900° C. The product thus obtained is a black microcrystalline product in which the unit cell dimension is 4.78 Angstroms (compared with the theoretical value of 4.76 calculated from the tetrahedral covalent radii).

It has also been found that the cubic crystalline form of BAs may be transformed by heating it at a temperature in the range of from 900° C. to 1000° C. to obtain the orthorhombic crystalline product. As a result of such a thermal transformation the black cubic crystalline material is changed to a tan colored orthorhombic product.

The present BAs compound is stable against decomposition. While I have been unable to melt the present compounds, from theoretical considerations and by analogy with data on similar compounds, they should melt at a temperature greater than about 2000° C.

Both cubic and orthorhombic boron arsenide as prepared by me are stable against many reagents such as aqua regia. The orthorhombic boron arsenide is also resistant to boiling nitric acid and other concentrated mineral acids.

Useful articles, such as chemical apparatus, including crucibles and parts for jet engines, such as turbine blades, deflectors or nozzles, which are normally exposed to high temperatures are readily fabricated from orthorhombic boron arsenide according to my process. By reason of the extreme stability of the product, these objects are resistant to the action of abrasive particles, such as fly ash which may be present in the high temperature gases of a jet engine.

The crystalline forms of boron arsenide which are made by the processes of the present invention are particularly advantageous in the manufacture of semi-conductors. It has been found in particular that the cubic crystalline form of boron arsenide is characterized by a negative temperature coefficient of resistance which makes the material in a suitable component in the manufacture of various semi-conductor products. The orthorhombic form of boron arsenide is also of utility as a semiconductor component, particularly for high temperature service because of the unusual high temperature stability of this crystalline form. It has been found by optical measurements on cubic crystalline boron arsenide that it has a forbidden energy gap of about 4.5 electron volts, although this value may vary in the range of from 4.0 to 5.0 electron volts depending upon the purity of the material and the method employed in making the measurements.

Examples of semiconductor devices which may be made from the novel forms of boron arsenide include rectifiers, transistors and other barrier layer devices, particularly for use at high temperatures. Such articles of manufacture are generally made from combinations of the boron arsenide with other crystalline materials such as silicon or germanium and also with the development of suitable controlled impurities if desired. Examples of impurities which may be introduced into the crystalline boron arsenide in order to control the semiconductor properties include the elements of Group II of the periodic table, such as zinc or Group VI, exemplified by selenium.

The semiconductor properties of the crystalline forms of boron arsenide are also shown by the optical characteristics of these materials. An unusually effective field of utilization, particularly for the orthorhombic crystalline form which is characterized by very high temperature stability is an optical window in test instruments and in guided missiles and space ships. Such windows may also be fabricated with an external boron arsenide protective layer deposited on a base of quartz or other transmissive material. It has been found that the said orthorhombic crystalline form of boron arsenide is characterized by an unexpected transmissive power for radiation of characteristic wave lengths. This permits the fabrication of the window which is to be subjected to high temperature and high pressure conditions, for example, as an observation port in a furnace or nuclear reactor or as an observation port for a space ship or missile which is intended to approach quite close to the sun or stars. In this relationship it is thus possible to pass the desired band of radiation through the window of crystalline boron arsenide while at the same time providing for the maintenance of erosion resistance of such a window, even when it is subjected to an ambient temperature of 5,000° F. to 6,000° F.

Elemental boron powder is easily pressed into various shapes by methods familiar to those skilled in the art of powder metallurgy. I take the boron articles so produced and expose them at temperatures of about 800° C. to 900° C. to the vapor of arsenic for the desired length of time. The reaction commences at the surface of the article forming the compounds BAs thereon and as the treatment is continued the arsenic penetrates the surface and gradually works its way into the center of the article, ultimately converting the entire mass to boron arsenide. The time required for complete reaction will be dependent upon the temperature, the mass of material treated, the degree of porosity of the article, the particle size and also upon the pressure of arsenic vapor. By employing a suitable container the pressure of arsenic vapor may be raised from atmoshperic to several atmospheres, and in extreme cases even to several hundred atmospheres. By this means, even relatively large and bulky articles may be substantially completely converted to boron arsenide.

It is also possible, of course, to sinter objects pressed from the boron arsenide crystalline powder which is readily prepared as described herein. When pressing boron arsenide powder into pressed objects the green strength of the piece will depend upon the amount of pressure exerted in the die. If necessary, organic binders, e.g., resinous polymers, may be employed in small quantities to increase the green strength of the piece. The pressed article of boron arsenide so prepared is then subjected to a temperature ranging upwardly from about 1,300° C. to about 2,500° C. for a sufficient length of time to develop the required strength.

Another embodiment of the present invention is the production of boron arsenides by the reaction of various boron sources such as boron halides, specifically boron trichloride, together with elemental arsenic in the presence of hydrogen. The said reaction is conducted in the vapor phase at a temperature of from 700° C. to 900° C. Either the boron source in gaseous form or the vaporized arsenic may be employed in stoichiometric excess, although it is desirable that the more expensive reactant, i.e., the boron compound, such as boron trichloride, be utilized in stoichiometric proportion with the arsenic being supplied in excess. It is preferable, although not essential, that the atmosphere within the reaction system be an inert gas such as nitrogen, helium, argon, etc. However, relatively minor proportions of oxygen can be tolerated in the system. The proportion of hydrogen which is present is not critical, although it is desirable that the proportion of hydrogen be at least 10% by weight relative to the total weight of the gaseous reactants. It has been found convenient to carry out this method by charging the desired quantity of solid arsenic into a tubular furnace, heating the said arsenic in order to vaporize the same while at the same time introducing a gaseous stream of boron trichloride and hydrogen. The product thus obtained is the desired boron arsenide which is removed from the reaction zone and collected in a condenser or other form of relatively cool surface remote from the reaction zone. The product obtained when operating at a temperature of from 700° C. to 900° C. is the cubic form of boron arsenide, BAs, which is obtained as a black, finely-divided powder. However, if the high temperature form $B_6As$ is desired, the temperature of the reaction zone, or of a further transformation zone is maintained at a temperature of 900° C. to 1,200° C. It has been found that such higher temperatures bring about the formation of the tan-colored orthorhombic form of boron arsenide.

It will, of course, be understood that any source of arsenic vapor may be used. For convenience in handling, the solid form will generally be readily available and safer to use than the vapor. However, it is understood that either solid or vapor sources may be used, and as a matter of fact, any of the known alletropic modifications of arsenic are useful I may also use those compounds of arsenic which, upon heating, decompose with the formation of arsenic vapor.

Boron arsenide prepared in accordance with the present invention is characterized by unusual stability, particularly at high temperatures. However, it has been found that certain thermal treatments such as hot pressing of a molded form of boron arsenide at temperatures of the order of 1,000–2,000° C. result in a transformation of a part of the boron arsenide to elemental boron which remains in intimate admixture or chemical combination with the unreatced boron arsenide. The product thus obtained may accordingly constitute a major proportion with either the boron arsenide or elemental boron as a matrix. The other of the two constitutents constitutes a dispersed phase within the matrix.

The product thus obtained by high temperature pressing is an exceedingly tough and hard composition. This composition is suitable for use as a refractory, for example, as a nose cone of a rocket, guided missile or other space vessels. The matrix combination of boron and boron arsenide is also useful for the fabrication of crucibles and other chemical vessels. An embodiment of the invention therefore includes shaped objects obtained by thermally decomposing boron arsenide to obtain mixtures of elemental boron with boron arsenide with the two components being partially dissolved and with the excess of either component being intimately dispersed within the composition. Such thermal decomposition may be carried out upon individual particles or masses of boron arsenide, or preferably within a confining form in order to obtain the desired shape of the boron arsenide which upon transformation during hot pressing treatment yields the mixture of elemental boron with unreacted boron arsenide.

The following examples illustrate specific embodiments of the present invention.

*Example 1*

The preparation of boron arsenide from boron trichloride and arsenic is illustrated in the present example. A tubular electric furnace was charged with 3.7280 g. of elemental arsenic in a graphite boat. The boat was located in a furnace which was then brought up to a temperature of about 520–540° C. The tube in which the arsenic was placed was then connected with a gas inlet system, through which a stream of gaseous boron trichloride and hydrogen in equimolar proportions was continuously charged. The product, orthorhombic boron arsenide having the approximate formula, $B_6As$, was a tan-colored material which was obtained in substantially quantitative yield.

The product was subjected to X-ray diffraction analysis and was found to be characterized as an orthorhombic crystalline material. The material was found to resist solution by concentrated hydrochloric and nitric acids, as well as by aqua regia.

*Example 2*

A graphite boat was prepared by drilling a ⅜″ hole in a cylindrical piece of one-half inch graphite rod and splitting the tube which was formed. Into the boat so formed was placed 1.9049 g. of amorphous boron. The boat was next placed in one end of a ¾ inch quartz tube about 16 inches long, one end of which had been sealed off. Into the other end of the quartz tube was placed 15.2535 g. of arsenic in another graphite boat. The tube was then evacuated and sealed off. The end of the quartz tube containing the boron was placed in a furnace which was later heated to 900° C. The end of the quartz tube containing the arsenic was placed in an adjacent connecting furnace which was later heated to 610° C.

The heating of the quartz tube and its contents caused the arsenic to vaporize, forming arsenic vapor filling the entire tube, which vapor then reacted with the hot boron. The tube and its contents were heated for 90 hours.

Upon completion of the heating described above, the quartz tube was cooled, broken open and the graphite boat containing the boron weighed. The original quantity of boron had increased in weight by 2.8968 g., corresponding to a 21.9% conversion of boron arsenide, BAs.

A sample of the product was examined by X-ray diffraction and found to be crystalline. The measurements indicated a cubic structure with a unit cell length of about 4.78 Angstrom units. Typical interplanar spacing and intensity data of the prominent lines were as follows: (Ni filtered, CuK alpha radiation)

| $d$ Value A. | Intensity ($I/I_o$) |
|---|---|
| 2.759 | 100 |
| 2.389 | 34 |
| 1.688 | 32 |
| 1.439 | 27 |
| 1.378 | 5 |
| 1.194 | 3 |
| 1.096 | 8 |
| 1.069 | 6 |
| 0.9751 | 6 |
| 0.9195 | 6 |
| 0.8446 | 3 |
| 0.8075 | 9 |
| 0.7962 | 4 |

*Example 3*

Into a half inch diameter graphite boat was placed 1.6017 g. of amorphous boron. This boat was placed in one end of a three-fourth inch quartz tube about ten inches long, one end of which had been sealed off. Into the other end of the quartz tube was placed 12.1900 g. of arsenic in another graphite boat. The tube was then evacuated and sealed off. The end of the quartz tube containing the boron was placed in a furnace which was later heated to 1,000° C. The end of the quartz tube containing the arsenic was placed in an adjacent furnace which was later heated to 700° C. The tube and its contents were heated for 111 hours.

Upon completion of the heating described above the quartz tube was cooled, broken open and the graphite boat containing the boron weighed. The original quantity of boron had increased in weight by 1.8254 g., which corresponds to a 98% conversion to the boron arsenide, $B_6As$. This product was light tan in color and very resistant to attack by hot oxidizing acids, such as nitric acid and aqua regia.

A sample of the product was examined by X-ray diffraction and found to be craystalline. The measurements indicated an orthorhombic modification with the following unit cell dimension:

$a = 9.710$
$b = 4.343$
$c = 3.066$ Angstrom units

Typical interplanar spacing and intensity data of the prominent lines were as follows: (Ni filtered, CuK alpha radiation)

| $d$ Value A. | Intensity ($I/I_o$) |
|---|---|
| 4.848 | 62 |
| 3.969 | 36 |
| 3.069 | 64 |
| 2.596 | 100 |
| 2.426 | 4 |
| 2.161 | 31 |
| 1.981 | 100 |
| 1.905 | 2 |
| 1.773 | 14 |
| 1.665 | 48 |
| 1.618 | 4 |
| 1.536 | 80 |
| 1.464 | 18 |
| 1.432 | 15 |
| 1.323 | 26 |
| 1.320 | 5 |
| 1.265 | 4 |
| 1.252 | 3 |
| 1.215 | 6 |
| 1.196 | 1 |
| 1.161 | 6 |
| 1.128 | 2 |
| 1.086 | 7 |
| 1.060 | 6 |
| 1.024 | 5 |
| 1.001 | 15 |
| 0.971 | 1 |
| 0.952 | 4 |
| 0.943 | 1 |
| 0.926 | 1 |
| 0.910 | 2 |
| 0.887 | 3 |
| 0.872 | 3 |
| 0.865 | 2 |
| 0.852 | 2 |
| 0.839 | 3 |

*Example 4*

1.5684 g. of amorphous boron and 11.7884 g. of arsenic were heated together in a graphite boat in a sealed, evacuated quartz tube at 890° C. for 254 hours. When the quartz tube was cooled the excess arsenic had sublimed out of the boat into the cooler ends of the quartz tube. The tube was opened and the boron weighed. The original quantity of boron had increased in weight by 8.3496 g., which increase corresponds to a 77% conversion to the boron arsenide, BAs. The product had a cubic structure with a unit cell length of about 4.78 Angstrom units.

*Example 5*

This example illustrates the preparation of the orthorhombic form of boron arsenide from the cubic modification. The sample of cubic material which was used contained 15.8 weight percent boron (theoretical for the compound BAs is 12.6%), and had a unit cell length of about 4.78 Angstrom units.

0.7566 gram of the cubic material was heated in a steady stream of argon at 1,200° C. for one hour. 0.5071 gram of arsenic were volatilized from the cubic material by this treatment. The residual material contained 47.9 wt. percent of boron (theoretical for the compound $B_6As$ is 46.4 wt. percent boron). This residual material was a light tan color and had an orthorhombic structure.

What is claimed is:

1. Process for the production of shaped objects which comprises pressing a mass of finely-divided orthorhombic crystalline boron arsenide into the desired shape and heating the said mass at a temperature of from 900° C. to 1,200° C. in order to consolidate the said powder into a compact mass.

2. Boron arsenides having formulae within the range of from $B_5As$ to $B_7As$.

3. Boron arsenide having the formula $B_6As$.

References Cited

UNITED STATES PATENTS

| 2,798,989 | 3/1952 | Welker | 23—204 |
| 3,094,387 | 6/1963 | Williams | 23—204 |

OTHER REFERENCES

Mellor: "Comprehensive Treatise on Inorganic and Theoretical Chemistry," Longmans, Green and Co., N.Y. 1928, vol. 8, pp. 844–845.

OSCAR R. VERTIZ, *Primary Examiner.*

H. S. MILLER, *Assistant Examiner.*